Figure 2:
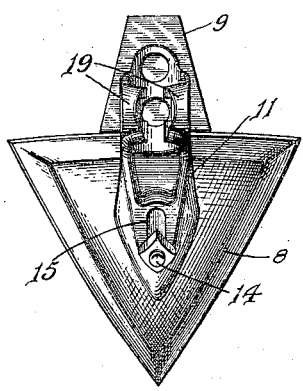

L. E. WATERMAN.
CULTIVATOR SHOVEL.
APPLICATION FILED MAR. 2, 1915.

1,212,295.

Patented Jan. 16, 1917.

Witnesses:
W. L. Dow
Della Atkinson

Inventor:
Lewis E. Waterman
By Pond & Wilson
Attys.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

CULTIVATOR-SHOVEL.

1,212,295.   Specification of Letters Patent.   Patented Jan. 16, 1917.

Application filed March 2, 1915. Serial No. 11,458.

*To all whom it may concern:*

Be it known that I, LEWIS E. WATERMAN, a citizen of the United States, residing at Rockford, in the county of Winnebago and State of Illinois, have invented certain new and useful Improvements in Cultivator-Shovels, of which the following is a specification.

This invention relates to earth-working shovels and has more particular reference to those used with agricultural implements, especially cultivators.

An important desideratum in cultivator shovels is to provide a shovel which may be used for universal cultivating, that is, one which is capable of effectively cultivating a large variety of crops in soils of different characters and conditions. It is especially desirable that the shovel have clear-cutting and scouring qualities so that it will not be necessary to repeatedly resharpen the cutting edge and refinish the working face of the blade.

One of the primary objects of my invention, therefore, is to provide a cultivator shovel which will embody the desirable characteristics abovementioned.

With these considerations in view, I have provided a cultivator shovel having a blade, the contour of which is in the shape of an isosceles triangle and the working face of which presents a spherical concave surface, and have provided means for so adjustably supporting the blade that it may be positioned with any one of its vertices in position as the working point of the blade, thereby increasing the working life of the blade to three times that of the ordinary one-point blade. To insure perfect scouring and positive suction while in operation, I have formed the working face of the blade in a concave spherical manner, so that the blade will be properly shaped along the longitudinal medial line of the shovel passing through the working point thereof. To permit the blade to be readily and easily adjusted so as to position any one of its vertices as the working point, I have so mounted the blade that it may be rotated on a centrally disposed transverse axis to bring the desired point into working position. I have also provided a shank whereby dirt will be directed laterally over the side-wings of the blade, and have utilized the said shank as a means holding the blade in operative position. To compensate for the wearing of cutting edges of the blade, I have provided means for adjusting the blade with respect to the shank so that, when the said sides have become shortened by wear or sharpening thereof, the blade may be adjusted to position its side opposite the working point in coöperative relation with the shank.

Figure 1:
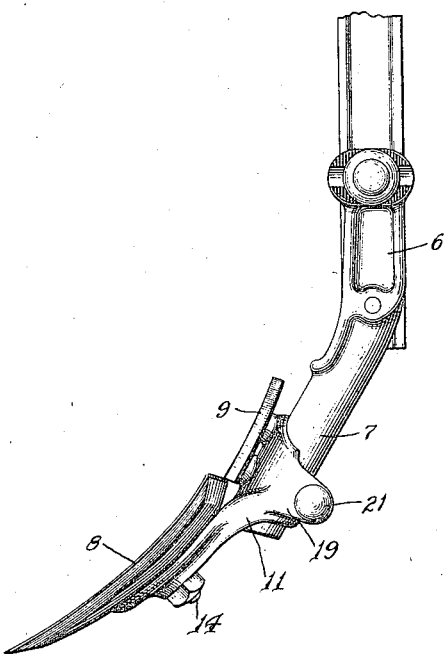
Figure 5:
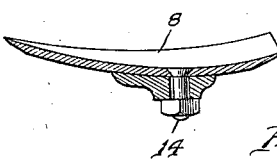
Figure 3:
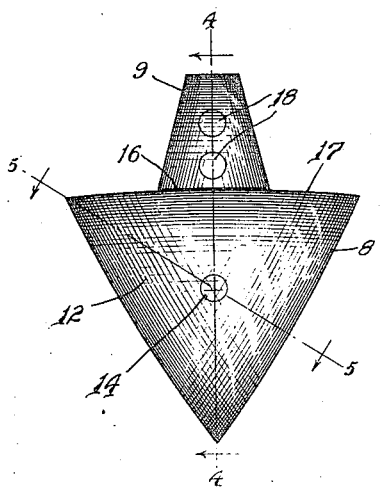
Figure 4:
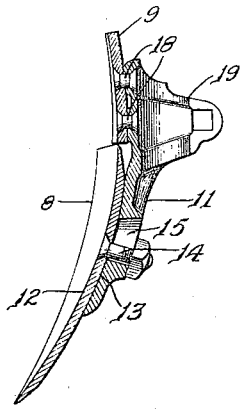

Referring to the drawings: Figure 1 is a side elevation of my improved cultivator shovel mounted on a suitable support; Fig. 2 is a rear view of the cultivator shovel; Fig. 3 is a face view of the shovel; and Figs. 4 and 5 are transverse sectional views through the shovel taken on the lines 4—4 and 5—5 respectively, of Fig. 3.

By reference to the drawings, it will be observed that the means for supporting the cultivator shovel is in the form of a vertical post having a forwardly and downwardly inclined cylindrical end 7 upon which the shovel is mounted, the end 7 serving to hold the shovel in an inclined position and also permit it to be adjusted vertically and rotatably thereon.

The shovel comprises in general a blade, a shank, and a block upon which the blade and shank are mounted, said elements being designated generally by reference characters 8, 9, and 11, respectively. The blade may be of any suitable material, the working face 12 being preferably of steel, and is in contour an equilateral triangle spherically concaved, as shown in Figs. 4 and 5. The back of the blade is cambered in conformity with the contour of the working face 12 and seats upon a concave face on the lower portion of the block 11. The blade is adjustably held upon the seat 13 by a pivot bolt 14 passing through a slot 15 in the block, having its head countersunk in the blade and provided at its opposite end with a nut adapted, when screwed down, to clamp the blade fixedly to the block. Referring to Fig. 3, it will be observed that the bolt 14 is disposed concentrically of the blade so that the blade may be rotatably adjusted on the bolt to bring any one of its vertices in lowermost position to serve as the working point of the blade. The sides are sharpened along their edges as shown in Fig. 4, so that they may cut effectively.

The shank 9, consisting of a slightly dished quadrilateral steel plate, is of such width that when positioned with its side 16 abutting against the top side of the blade, the laterally extending portions of the blade will form side-wings 17. The shank is fixedly attached to the block 11 by rivets 18 with its face forming a continuation of the working face 12 of the blade. The block 11 is provided with a pair of clamping arms 19 shaped to embrace the cylindrical posts 7 and be clamped thereto by bolts 21. The formation of the block 11, together with the incline of the post end 7 is such that the blade is carried when in operation in a pronounced reclining position, as shown in Fig. 1. This general incline of the blade, together with its concave working face gives the blade a strong and positive suction during operation and causes the dirt to be raised, along a gradual incline free from abrupt angles, with the result that the free passage of the dirt and the suction of the shovel will keep the blade perfectly scoured. The curvature of the blade also tends to turn the earth outwardly toward the side-wing portions and the shank 9 further assists in effecting a lateral distribution of the earth from each side of the blade.

By reference to Figs. 2 and 4, it will be noted that the aperture or slot 15 is elongated and permits, when any of the sides of the blade are shortened by wear or sharpening, the blade to be moved bodily toward the shank 9 by sliding the pivot bolt 14 in said slot to position the top edge of the blade against the edge 16 of said shank. It is obvious, however, that if preferred, the shank might be adjustably mounted to effect this relative movement between the blade and shank.

From the foregoing, and particularly by reference to Figs. 4 and 5, it will be apparent that no matter which vertex of the blade is positioned to act as the working point, the curvature of the working face of the blade is always the same. Thus, each vertex of the blade may be used in succession as the working point, thereby insuring a maximum working life to the blade, and the working efficiency of the blade is uniformly maintained regardless of which vertex is used as the point, since the curvature of the blade along the longitudinal medial line thereof is always the same.

I claim:

1. A cultivator shovel comprising an equilateral blade, a shovel standard, a shank blade portion secured thereto, and means for securing the blade to the standard centrally below the shank with one of the edges of the blade in juxtaposition thereto, said means permitting the blade to be rotatably adjusted on an axis disposed centrally thereof to position any of its edges in juxtaposition to the shank whereby any of the apices of the blade may be positioned as the working point thereof, the shank being shaped to form a continuation of the shovel face of the blade when the same is in any of its adjusted positions.

2. A cultivator shovel comprising a blade, a pivot bolt attached to the center of the blade, means for supporting the blade, including a block shaped to receive the rear face of the blade and provided with a vertically extending slot for the reception of said pivot bolt and, a shank blade-portion secured to the block above the blade and coöperating with the adjoining edge thereof so as to hold the blade against rotation on its pivot bolt and to form a continuation of the shovel surface of the blade, said slot in the block permitting the bolt to be secured in different positions in the slot so that when the blade becomes worn it may be adjusted and maintained in coöperative relation to the shank.

3. A cultivator shovel comprising an equilateral blade, a shovel standard, a shank blade-portion secured thereto, and means for rigidly securing the blade to the standard centrally below the shank with one of the edges of the blade in juxta-position to the shank said means permitting the blade to be rotatably adjusted on an axis disposed centrally thereof to position any of its edges in juxta-position to said shank, the shank being shaped to form a continuation of the shovel face of the blade and being of less width than any of the cutting edges thereof.

4. A cultivator shovel comprising a blade the working face of which is in the form of a concave-spherical triangle, means for mounting the blade so that it may be rotatably adjusted on an axis disposed centrally thereof whereby to position any one of its vertices as the working point of the blade, a shank blade portion having a working face of less width than a side of the blade, and means for securing the shank centrally above the blade in juxta-position thereto, said working face of the shank being shaped so as to form a continuation of the working face of the blade regardless of which vertex thereof is positioned as the working point and forming a central divide for passing the earth sidewise over the two uppermost vertices which form side-shank sections of the blade.

LEWIS E. WATERMAN.

Witnesses:
H. T. Evans,
E. R. Block.